United States Patent
Jau et al.

(10) Patent No.: US 10,639,820 B2
(45) Date of Patent: May 5, 2020

(54) PHOTOCURING TYPE 3D PRINTER AND PEELING METHOD FOR USING THE SAME

(71) Applicants: XYZPRINTING, INC., New Taipei (TW); KINPO ELECTRONICS, INC., New Taipei (TW)

(72) Inventors: Wei-Chun Jau, New Taipei (TW); Tsung-Hua Kuo, New Taipei (TW); Ming-Hsiung Ding, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 104 days.

(21) Appl. No.: 15/871,008

(22) Filed: Jan. 14, 2018

(65) Prior Publication Data
US 2019/0077055 A1  Mar. 14, 2019

(30) Foreign Application Priority Data

Sep. 14, 2017 (CN) .......................... 2017 1 0827291

(51) Int. Cl.
*B29C 33/00* (2006.01)
*B29C 33/44* (2006.01)
(Continued)

(52) U.S. Cl.
CPC .......... *B29C 33/442* (2013.01); *B29C 64/124* (2017.08); *B29C 64/129* (2017.08);
(Continued)

(58) Field of Classification Search
CPC ... B29C 33/442; B29C 64/245; B29C 64/393; B29C 64/124; B29C 64/379;
(Continued)

(56) References Cited

U.S. PATENT DOCUMENTS

| | | | | |
|---|---|---|---|---|
| 2013/0292862 A1* | 11/2013 | Joyce | ...................... | B29C 64/35 264/40.1 |
| 2014/0191442 A1* | 7/2014 | Elsey | ..................... | B33Y 10/00 264/401 |

(Continued)

*Primary Examiner* — Alison L Hindenlang
*Assistant Examiner* — Shibin Liang
(74) *Attorney, Agent, or Firm* — Chun-Ming Shih; HDLS IPR Services (57) ABSTRACT

A photocuring type 3D printer (4) includes a sink (41) for containing a forming liquid (40), a glass layer (42) disposed on the sink (41), a membrane (43) disposed above the glass layer (42), an emitting unit (46) disposed below the sink (41), and a forming platform (45) arranged to immerse in the forming liquid (40) for constructing a model (5). The 3D printer (4) further includes an adjusting unit (44) disposed at one side of the sink (41). One end of the membrane (43) is connected to the adjusting unit (44), and another end of the membrane (43) is connected to the other side of the sink (41) opposite to the adjusting unit (44). The 3D printer (4) controls the adjusting unit (44) to execute homing for tightening the membrane (43) before solidifying the model (5) and controls the adjusting unit (44) to move for relaxing the membrane (43) after the model (5) is solidified, and controls the forming platform (45) to move after the membrane (43) is relaxed for peeling the model (5) from the membrane (43).

7 Claims, 11 Drawing Sheets

(51) Int. Cl.
- *B29C 64/245* (2017.01)
- *B29C 64/379* (2017.01)
- *B29C 64/393* (2017.01)
- *B33Y 30/00* (2015.01)
- *B33Y 10/00* (2015.01)
- *B29C 64/124* (2017.01)
- *B29C 64/129* (2017.01)
- *B33Y 40/00* (2020.01)
- *B33Y 50/02* (2015.01)

(52) U.S. Cl.
CPC .......... *B29C 64/245* (2017.08); *B29C 64/379* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ............ B29C 67/0051; B29C 67/0055; B29C 67/0062; B29C 67/006; B29K 105/00; B33Y 10/00; B33Y 77/00; B33Y 30/00
See application file for complete search history.

(56) References Cited

U.S. PATENT DOCUMENTS

2017/0197363 A1* 7/2017 Frantzdale ............. B33Y 10/00
2018/0341184 A1* 11/2018 Hundley ............. B29C 35/0888

\* cited by examiner

PHOTOCURING TYPE 3D PRINTER AND PEELING METHOD FOR USING THE SAME

BACKGROUND OF THE INVENTION

Field of the Invention

The technical field relates to a 3D printer, in particular relates to a photocuring type 3D printer and peeling method for using the same.

Description of Related Art

Figure 1:
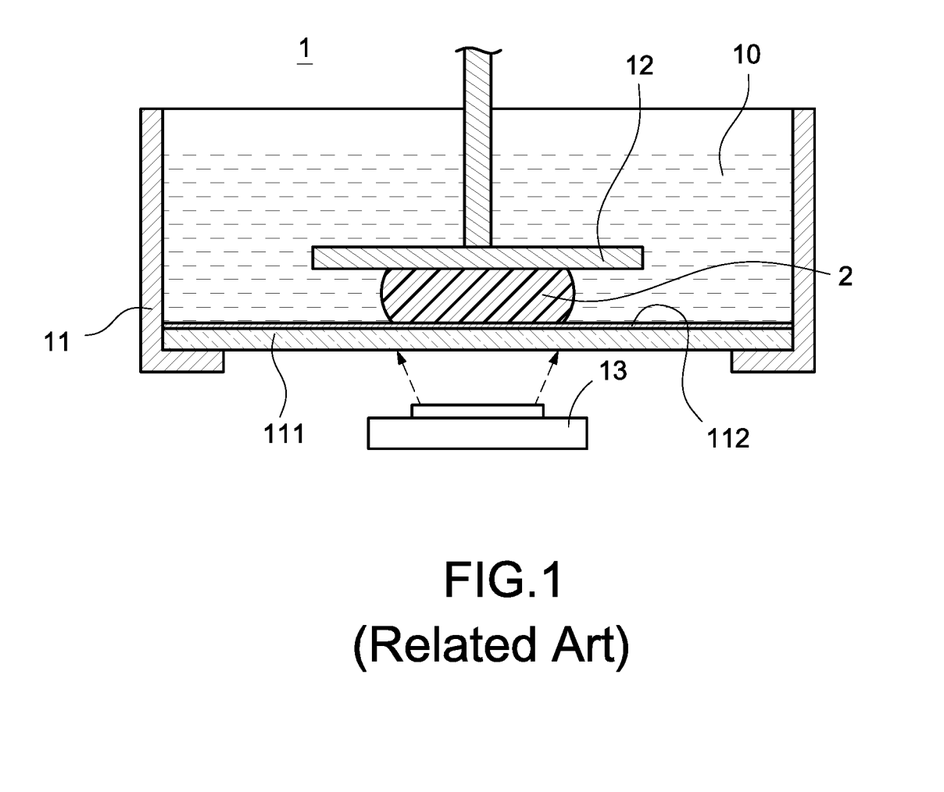
FIG. 1 is a schematic diagram of a photocuring type 3D printer of related arts.

FIG. 1 is a schematic diagram of a photocuring type 3D printer of related arts. An under illumination photocuring type 3D printer is disclosed in FIG. 1 (referred as the 3D printer 1 in the following description). The 3D printer 1 includes a sink 11 for containing a forming liquid 10, a glass layer 111 disposed on the bottom of the sink 11, a membrane 112 disposed above the glass layer 111, a forming platform 12 arranged to immerse in the forming liquid 10 for constructing a model 2, and an emitting unit 13 disposed below the sink 11 and the glass layer 111.

When performing printing, the 3D printer 1 controls the forming platform 12 to move toward the internal side of the sink 11 to locate at a printing height of a printing layer of the model 2. Next, the 3D printer 1 controls the emitting unit 13 to emit lights towards the sink 11 for solidifying the forming liquid 10 between the forming platform 12 and the membrane 112 to be a printing layer of the model 2 attaching to the forming platform 12. Next, the 3D printer 1 controls the forming platform 12 to raise upwards to peel the solidified model 2 from the membrane 112, and controls the forming platform 12 to move to a printing height of the next printing layer of the model 2 for solidifying the next printing layer of the model 2 via the emitting unit 13.

Figure 2A:
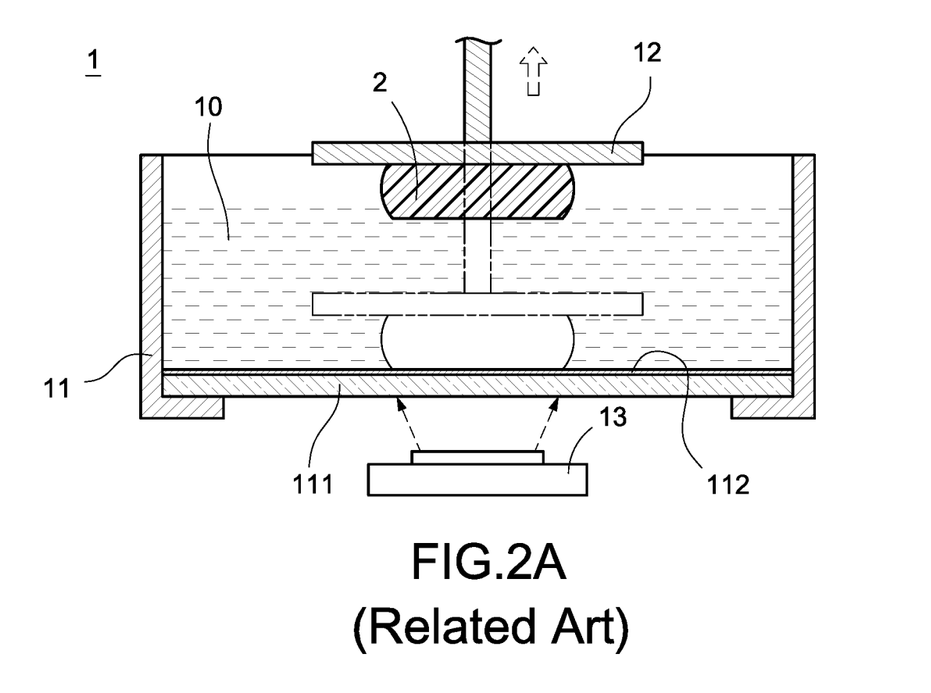
FIG. 2A is a schematic diagram of model peeling according to a first embodiment of the related arts.

FIG. 2A is a schematic diagram of model peeling according to a first embodiment of the related arts. In the embodiment shown in FIG. 2A, when the 3D printer 1 is going to peel a solidified model 2 from the membrane 112, the 3D printer controls the forming platform 12 to raise directly for forcibly separate the model 2 from the membrane 112 (i.e. the upward force breaks the vacuum at the contact between the model 2 and the membrane 112 and separates the model 2 and the membrane 112). However, if the contact area between the model 2 and the membrane 112 is larger, then this peeling approach could highly possible damage the model 2 (for example damage the bottom surface of the model 2 that contacts with the membrane 112, or any weak location on the model 2).

Figure 2B:
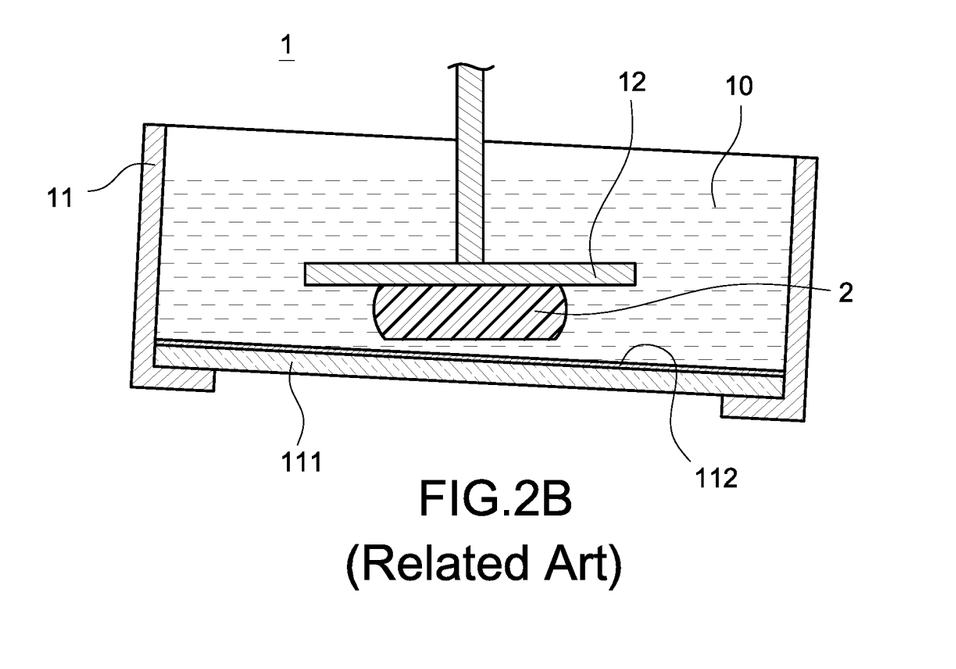
FIG. 2B is a schematic diagram of model peeling according to the second embodiment of the related arts.

FIG. 2B is a schematic diagram of model peeling according to the second embodiment of the related arts. In the embodiment shown in FIG. 2B, when peeling a solidified model 2 from the membrane 112, the 3D printer controls either side of the sink 11 to tilt downward to separate the model 2 from the membrane 112 (i.e. the downward force breaks the vacuum at the contact between the model 2 and the membrane 112 and separates the model 2 and the membrane 112). However, similar to the embodiment shown in FIG. 2A, if the contact area between the model 2 and the membrane 112 is larger, this peeling approach could highly possible damage the model 2.

Figure 2C:
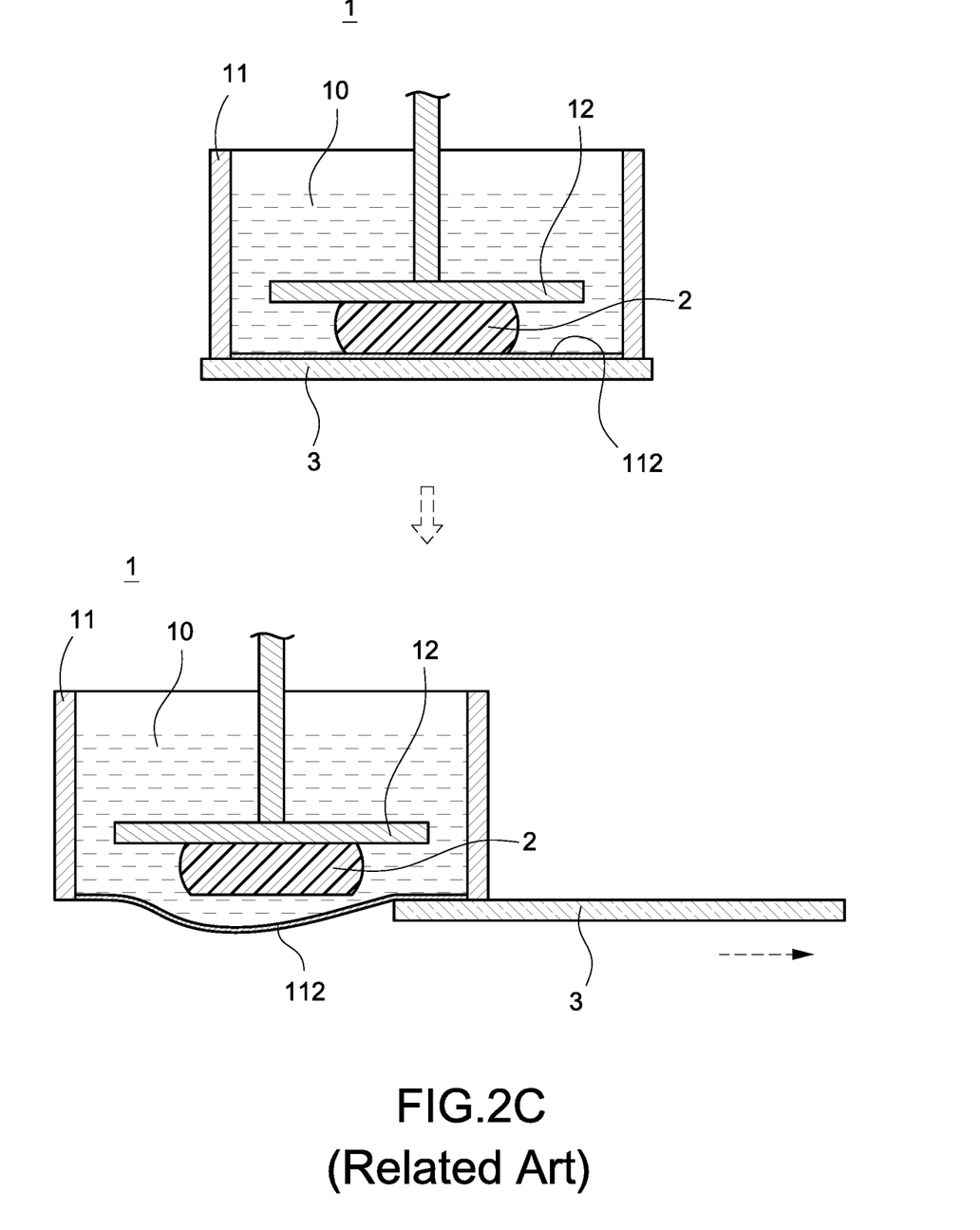
FIG. 2C is a schematic diagram of model peeling according to the third embodiment of the related arts.

FIG. 2C is a schematic diagram of model peeling according to the third embodiment of the related arts. Different from the embodiments shown in FIG. 2A and FIG. 2B, the 3D printer 1 shown in FIG. 2C uses a light transmitting scraper 3 to replace the glass layer 111 disposed on the bottom of the sink 11 in the first embodiment and the second embodiment. Specifically, the light transmitting scraper 3 is disposed below the bottom of the sink 11 and is controlled to move toward the external side of the sink 11.

As shown in FIG. 2C, when peeling a solidified model 2 from the membrane 112, the 3D printer controls the light transmitting scraper 3 to move toward the external side of the sink 11. Thus, the membrane 112 extends downward due to supporting the weight of the forming liquid 10 and then separates from the model 2.

However, in the embodiment shown in FIG. 2C, when the 3D printer 1 is about to perform the peeling procedure, the 3D printer 1 controls the light transmitting scraper 3 to move toward the external side of the sink 11, and controls the light transmitting scraper 3 to execute homing (i.e. moving to a fix location under the sink 11) after the peeling procedure is completed. As a result, the membrane 112 continuously rubs against the light transmitting scraper 3 during printing and lowers the life of the membrane 112.

Also, the lights emitted by the emitting unit 13 have to travel through both the light transmitting scraper 3 and the membrane 112 to solidify the model 2 and inevitably wastes the power efficiency of light in the solidifying process of the model 2. Also, the light transmitting scraper 3 has to move toward the external side of the sink 11 which is out of the range of the membrane 112 during the peeling procedure, therefore the required mechanical dimension of the 3D printer 1 is large (typically is twice of the sink width), and such design may lower user's willingness to use the 3D printer 1.

SUMMARY OF THE INVENTION

The disclosure is directed to a photocuring type 3D printer and a peeling method for using the same. A membrane of a 3D printer is first relaxed and then a peeling procedure is performed, which facilitates the peeling procedure and effectively avoids the model from being damaged by the peeling procedure.

In an example embodiment, a photocuring type 3D printer includes a sink for containing a forming liquid, a glass layer disposed on the bottom of the sink, a membrane disposed above the glass layer, an emitting unit disposed below the sink, and a forming platform disposed above the sink so as to immerse in the forming liquid for constructing a model, a microprocessor unit, and an adjusting unit disposed on one side of the sink wherein one end of the membrane is fixed to the adjusting unit and the other end is fixed to the other side of the sink opposite to the adjusting unit. When solidifying the model, the microprocessor unit controls the adjusting unit to execute homing for tightening the membrane; and the microprocessor unit controls the adjusting unit to move for relaxing the membrane after the model is solidified, and then controls the forming platform to move after the membrane is relaxed for peeling the model from the membrane.

Compare with the peeling methods in the related arts, the method of the disclosed example firstly relaxes a membrane and then perform a peeling procedure, wherein the vacuum is broke in lines when the model is peeled from the membrane to facilitate the peeling procedure and effectively avoid the model from being damaged in the peeling procedure.

In addition, the method of the disclosed example completes a peeling procedure with tightening and relaxing a membrane, additional peeling mechanism under the sink is not required and the lights emitted by the emitting unit does not need to travel through extra medium and waste the power efficiency of light. In addition, the 3D printer of the disclosed example does not cause the friction of the whole membrane when the peeling procedure is performed and increases the life of the membrane.

BRIEF DESCRIPTION OF DRAWING

The features of the present disclosed examples believed to be novel are set forth with particularity in the appended claims. The present disclosed examples, however, may be best understood by reference to the following detailed description of the present disclosed examples, which describes an exemplary embodiment of the present disclosed examples, taken in conjunction with the accompanying drawings, in which:

DETAILED DESCRIPTION OF THE INVENTION

In cooperation with attached drawings, the technical contents and detailed description of present disclosed examples are described thereinafter according to a preferable embodiment, being not used to limit its executing scope. Any equivalent variation and modification made according to appended claims is all covered by the claims claimed by the present disclosed examples.

Figure 3:
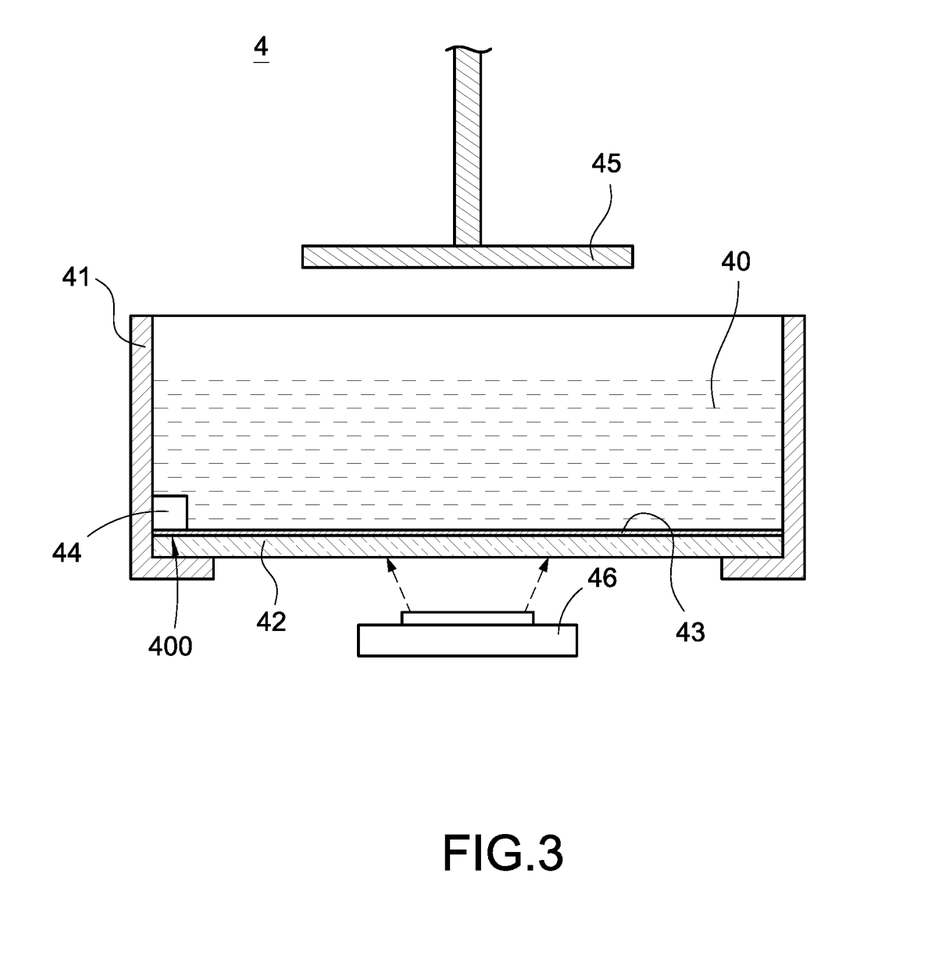
FIG. 3 is a schematic diagram of a photocuring type 3D printer according to a first embodiment of the disclosed example.

FIG. 3 is a schematic diagram of a photocuring type 3D printer according to a first embodiment of the disclosed example. A photocuring type 3D printer is disclosed and the photocuring type 3D printer of the disclosed example is an under illumination photocuring type 3D printer (referred as 3D printer 4 in the following description).

In the embodiment shown in FIG. 3, a 3D printer 4 includes a sink 41, a glass layer 42 disposed on the bottom of the sink 41, a membrane 43 disposed above the glass layer 42, a forming platform 45 disposed above the sink 41, and an emitting unit 46 disposed below the sink 41. Among which, the glass layer 42 and the sink 41 can be integrated in one piece (for example the sink 41 is a transparent shell body and the glass layer is the bottom of the transparent shell body) or are disposed individually, but the scope is not limited thereto.

The technical feature of the disclosed example is that the 3D printer 4 further includes an adjusting unit 44. The adjusting unit (44) is disposed on one side of the sink 41 and controlled by the 3D printer 4 to move. In an embodiment, the adjusting unit 44 is controlled by the 3D printer 4 to move horizontally. In another embodiment, the adjusting unit 44 is also controlled by the 3D printer 4 to move vertically and the scope of the disclosed example is not limited thereto.

Figure 4:
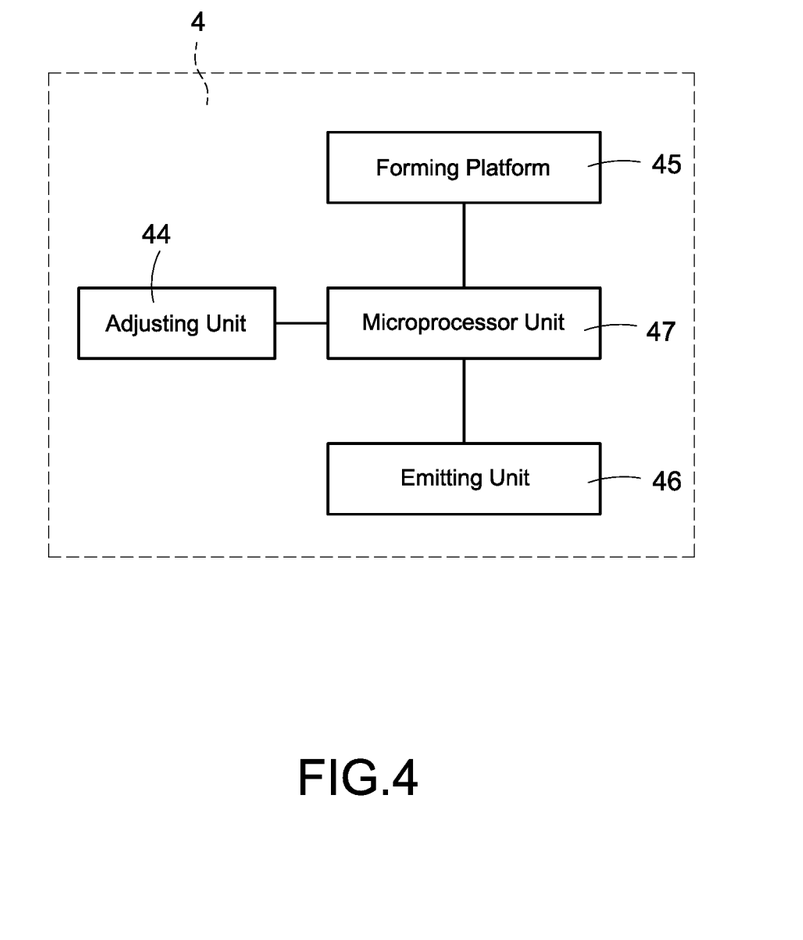
FIG. 4 is a block diagram of a photocuring type 3D printer according to the first embodiment of the disclosed example.

FIG. 4 is a block diagram of a photocuring type 3D printer according to the first embodiment of the disclosed example. The 3D printer 3 of the present embodiment also includes a microprocessor unit 47 electrically connected to the above-mentioned forming platform 45, the emitting unit 46 and the adjusting unit 44, and the microprocessor unit 47 is used for controlling actions of the above-mentioned forming platform 45, the emitting unit 46 and the adjusting unit 44.

The adjusting unit 44 is alternatively disposed at the internal side or external side of the sink 41. In the embodiment shown in FIG. 3, the adjusting unit 44 is disposed on the internal side of the sink 41, but the scope is not limited thereto. In the embodiment, one side of the membrane 43 is connected to the adjusting unit 44, the other side of the membrane 43 is connected to the other side of the sink 41 opposite to the adjusting unit 44. Thus, when the adjusting unit 44 is controlled by the microprocessor 47 of the 3D printer 4 to move (mainly move horizontally), the membrane 43 is led by the adjusting unit 44 to be tightened or relaxed (detailed in the following).

Figure 6A:
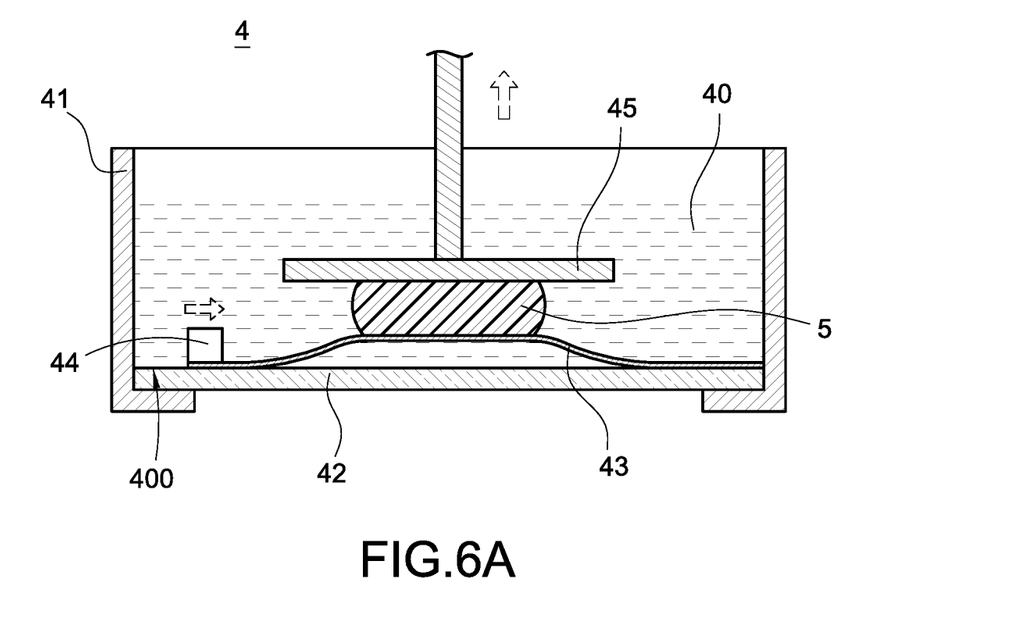
FIG. 6A is a schematic diagram of a first peeling action according to the first embodiment of the disclosed example.

The sink 41 is arranged for containing a forming liquid 40. In an embodiment, the forming liquid 40 is photopolymer. When the 3D printer 4 prints a printing layer of a model (the model 5 as shown in FIG. 6A), the microprocessor unit 47 controls the forming platform 45 to move (mainly move vertically along a z axis of the 3D printer 4) so as to immerse in the forming liquid 40 in the sink 41 and to locate at a printing height of the printing layer of the model 5 (i.e. to make the distance between the bottom of the forming platform 45 and the top surface of the membrane 43 equals to the mentioned printing height).

Next, the microprocessor unit 47 then controls the emitting unit 46 to emit lights towards the internal side of the sink 41 (mainly emit lights towards the location of the forming platform 45) for solidifying the forming liquid 40 between the forming platform 45 and the membrane 43 (i.e., the aforementioned printing layer) and attaching to the forming platform 45. Next, the 3D printer 4 may complete the printing actions of the printing layer after the solidified printing layer is peeled from the membrane 43.

In the disclosed example, the 3D printer 4 is a Digital Light Processing (DLP) 3D printer or a photocuring type stereolithography (SLA) 3D printer, the emitting unit 46 is a digital projector screen with a surface light emitting unit or a laser light source with a dot light emitting unit, and the scope of the disclosed example is not limited thereto.

In an example embodiment, the membrane 43 is a transparent membrane made by polytetrafluoroethylene (or so-called Teflon). The forming liquid 40 is solidified into a solid which attaches to the bottom of the forming platform 45 as well as the top surface of the membrane 43 by the vacuum phenomenon generated while solidifying. Accordingly, the 3D printer 4 has to perform a peeling procedure on the solidified printing layer after a printing layer of the model 5 is completely solidified and before continuing to print the next printing layer.

The technical feature of the disclosed example is that the microprocessor unit 47 controls the adjusting unit 44 to execute homing (i.e. moving horizontally to a homing location 400 of the 3D printer 4) before the microprocessor unit 47 prints a printing layer of the model 5 for tightening the membrane 43. In addition, when the membrane 43 is tightened, the microprocessor unit 47 controls the emitting unit 46 to emit lights for solidifying the printing layer and attaching to the forming platform 45 (at the same time the solidified printing layer may also attach to the top surface of the membrane 43).

Next, the microprocessor unit 47 controls the adjusting unit 44 to move (mainly move horizontally) for relaxing the membrane 43 after the printing layer is solidified, and controls the forming platform 45 to move along a z axis (move upward) for peeling the solidified printing layer from the membrane 43 for completing the peeling procedure of the printing layer.

Because the membrane 43 is relaxed and partly attaches to the printing layer, the membrane 43 is pulled by the printing layer and the forming platform 45 and generates an upward curved surface when the forming platform 45 moves upward. Thus, the drag force is smaller when the printing layer is peeled from the membrane 43 (peeling by breaking the vacuum in lines). Accordingly, the peeling procedure of the model 5 is implemented with minimum impacts with the method of the disclosed example.

The further details on how the microprocessor unit 47 of the 3D printer 4 of the disclosed example executes the peeling procedure are described in the following with reference to FIG. 5.

Figure 5:
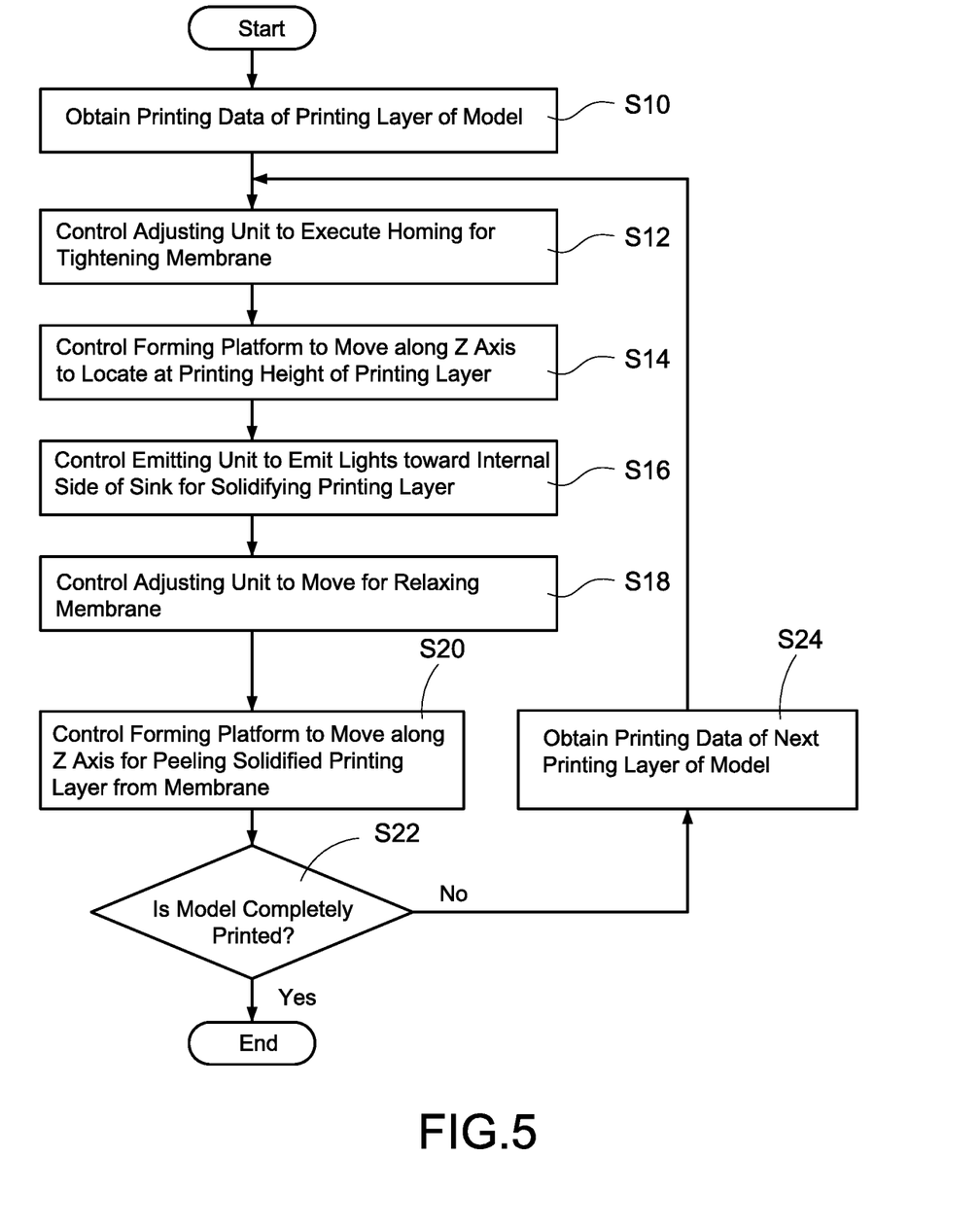
FIG. 5 is a peeling flowchart according to the first embodiment of the disclosed example.

FIG. 5 is a peeling flowchart according to the first embodiment of the disclosed example. In FIG. 5, a peeling method for photocuring type 3D printer (referred as peeling method in the following) is disclosed. The peeling method is primarily applied to a 3D printer 4 as shown in FIG. 3.

When the 3D printer 4 prints a model 5, the microprocessor unit 47 firstly obtains printing data of a printing layer (for example the first printing layer) of the model 5 (step S10). The printing data is mainly the slicing layer data corresponding to the printing layer to print.

Next, the microprocessor unit 47 controls the adjusting unit 44 to execute homing for tightening the membrane 43 (step S12). In an embodiment, the microprocessor unit 47 is pre-set to control the adjusting unit 44 to execute homing before the last power off or after the current power up of the 3D printer 4. Under the circumstance, the step S12 may be skipped. In another embodiment, no matter the adjusting unit 44 is homing or not, the microprocessor unit 47 executes step S12 before printing (i.e. before performing a photocuring procedure) for assuring that the adjusting unit 44 is at the homing location 400 and the membrane 43 is tightened. In an embodiment, the membrane 43 is tightened and lying flat on the top surface of the glass layer 42.

In the embodiment, the microprocessor unit 47 controls the adjusting unit 44 to move horizontally towards the external side of the sink 41 to the homing location 400 for tightening the membrane 43 in step S12. Also, the microprocessor unit 47 considers the adjusting unit 44 executed homing after the adjusting unit 44 moves to the homing location 400 and then performs the following actions.

After step S12, the microprocessor unit 47 controls the forming platform 45 to move along the z axis so as to immerse in the forming liquid 40 and to locate at the printing height of the printing layer (for example the first printing layer) (step S14). In an embodiment, the microprocessor unit 47 controls the forming platform 45 to move vertically along the z axis to the printing height. If the 3D printer 4 is an under illumination photocuring type 3D printer (i.e. the emitting unit 46 is disposed under the sink 41), the microprocessor unit 47 controls the forming platform 45 to move downward along the z axis to the printing height in step S14.

Specifically, the printing height refers to the distance between the bottom of the forming platform 45 and the top surface of the membrane 43 and the printing height equals to the slicing height of each printing layer of the model 5. The slicing data and the slicing height are known techniques used in 3D printing field which is not repeated hereto.

After step S14, the microprocessor unit 47 controls the emitting unit 46 to initiate and emit lights toward the internal side of the sink 41 for solidifying the printing layer and attaching to the forming platform 45 (step S16). Specifically, the printing data records the profiles of the printing layer, the microprocessor unit 47 controls the emitting unit 46 to emit lights toward the corresponding location on the bottom of the sink 41 according to the printing data in step S14 so as to make the profile of the solidified printing layer equals to the profile recorded in the printing data.

The microprocessor unit 47 then controls the adjusting unit 44 to move for relaxing the membrane 43 after the printing layer is solidified (step S18). In an embodiment, the microprocessor unit 47 controls the adjusting unit 44 to move horizontally away from the homing location 400 for relaxing the membrane 43. In another embodiment, the microprocessor unit 47 controls the adjusting unit 44 to move horizontally towards the center of the sink 41 for relaxing the membrane 43 and the scope is not limited thereto.

After step S18, the membrane 43 is relaxed. Next, the microprocessor unit 47 controls the forming platform 45 to move vertically along the z axis for peeling the solidified printing layer from membrane 43 (step S20). Specifically, if the 3D printer 4 is an under illumination photocuring type 3D printer, the microprocessor unit 47 controls the forming platform 45 to raise along the z axis to increase the distance between the forming platform 45 and the membrane 43 by increments for peeling the model 5 attached to the bottom of the forming platform 45 from the top surface of the membrane 43.

In an embodiment, the microprocessor unit 47 determines that the printing layer is peeled from the membrane 43 when the forming platform 45 moves (for example move upward) to a threshold height. In another embodiment, the microprocessor unit 47 senses the status of the forming platform 45 and the membrane 43 with a sense unit (not shown in the diagrams) and determines whether the printing layer is peeled from the membrane 43 or not via the sensing result generated by the sense unit.

As mentioned above, the membrane 43 is relaxed after step S18. When the membrane 43 is pulled upward by the printing layer attached to and the forming platform 45, an upward curved surface is generated. Thus, the printing layer may bear smaller drag force from the relaxed membrane 43 when being peeled therefrom. Accordingly, the 3D printer 4 may peel the model 5 from the membrane 43 with minimum impacts on the model 5.

After step S20, the printing layer is solidified and completely peeled off. Next, the microprocessor unit 47 determines if the model 5 is completely printed (step S22), i.e. determines if all printing layers of the model 5 are completely printed.

If the model 5 is not completely printed, the microprocessor unit 47 then obtains the printing data of the next printing layer (for example a second printing layer) (step S24), and re-executes step S12 to step S20 to print other printing layers of the model 5 according to the obtained printing data, and peels the printing layers which are printed completely (solidified completely) from the membrane 43. When the model 5 is completely printed, the microprocessor unit 47 controls the forming platform 45 to raise to an initial location (for example the top of the 3D printer 4) for a user to remove the whole model 5 attached to the forming platform 45 and completes the printing actions of the model 5.

Figure 6B:
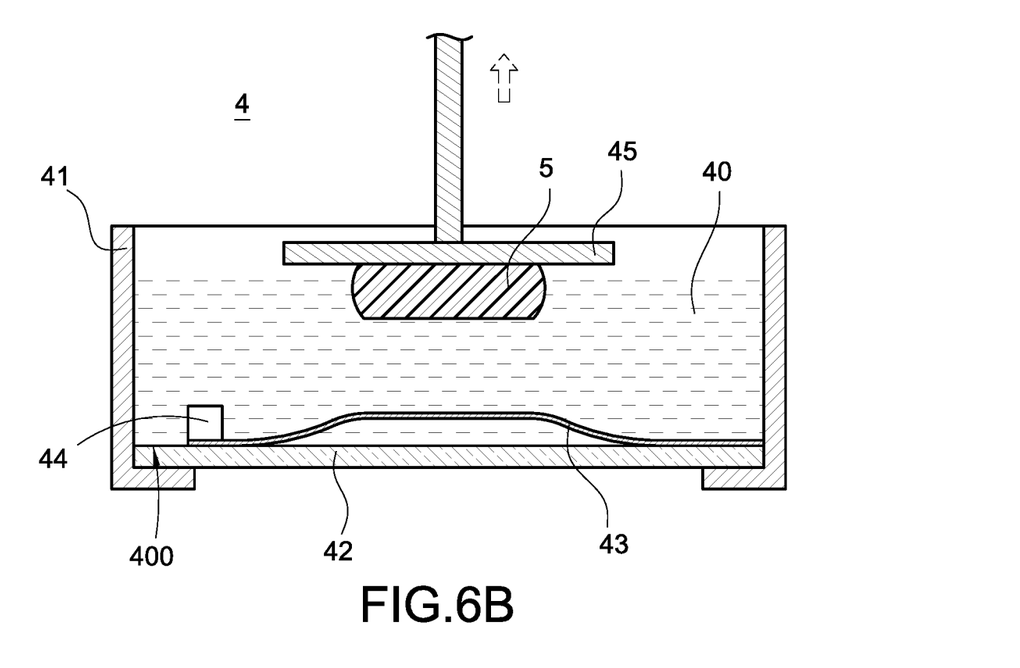
FIG. 6B is a schematic diagram of a second peeling action according to the first embodiment of the disclosed example.
Figure 6C:
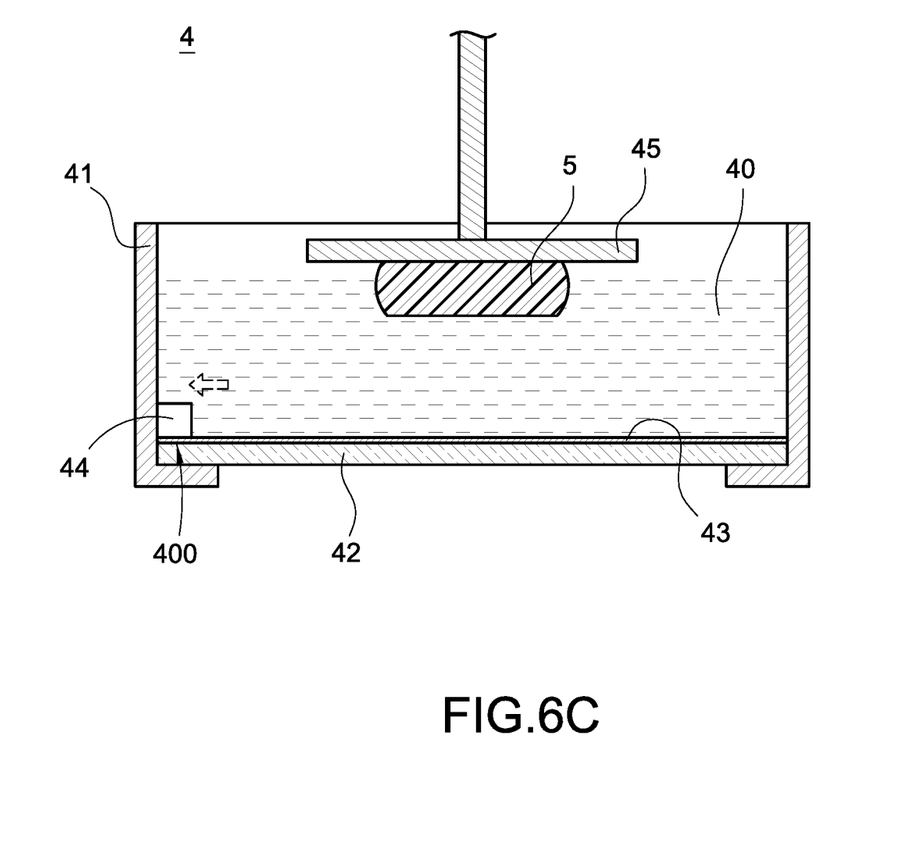
FIG. 6C is a schematic diagram of a third peeling action according to the first embodiment of the disclosed example.

FIG. 6A to FIG. 6C are schematic diagrams of a first peeling action to the a third peeling action according to the first embodiment of the disclosed example.

As mentioned previously, in order to ensure that the surface of the solidified printing layer may be flatten, the microprocessor unit 47 of the 3D printer 4 first controls the adjusting unit 44 to execute homing (i.e. move horizontally to the homing location 400) for tightening the membrane 43, then starts to print (i.e. controls the emitting unit 46 to emit lights). As shown in FIG. 6A, when the printing layer is solidified and the microprocessor unit 47 is going to perform the peeling procedure, the microprocessor unit 47 controls the adjusting unit 44 to move horizontally for relaxing the membrane 43. Also, the microprocessor unit 47 controls the forming platform 45 to move vertically to raise the model 5 after the membrane 43 is relaxed.

The membrane 43 may generate an upward curved surface after being relaxed. When the model 5 raises, the vacuum between the bottom of the model 5 and the top surface of the membrane 43 is broken in lines, then the bottom of the model 5 is finally separated from the top surface of the membrane 43 (as shown in FIG. 6B).

Next, as shown in FIG. 6C, when the model 5 is completely peeled, the microprocessor unit 47 controls the adjusting unit 44 to execute homing (i.e. move horizontally to the homing location 400) for tightening the membrane 43 again. After the membrane 43 is tightened, the microprocessor unit 47 proceeds to perform the printing actions of the next printing layer of the model 5.

With the technical features, the 3D printer 4 of the disclosed example provides flat membrane 43 and ensures the printing quality of the model 5, and also provides the membrane 43 with the curved surface as performing the peeling procedure wherein the model 5 can be easily peeled from the membrane 43 without damaging the model 5.

Figure 7A:
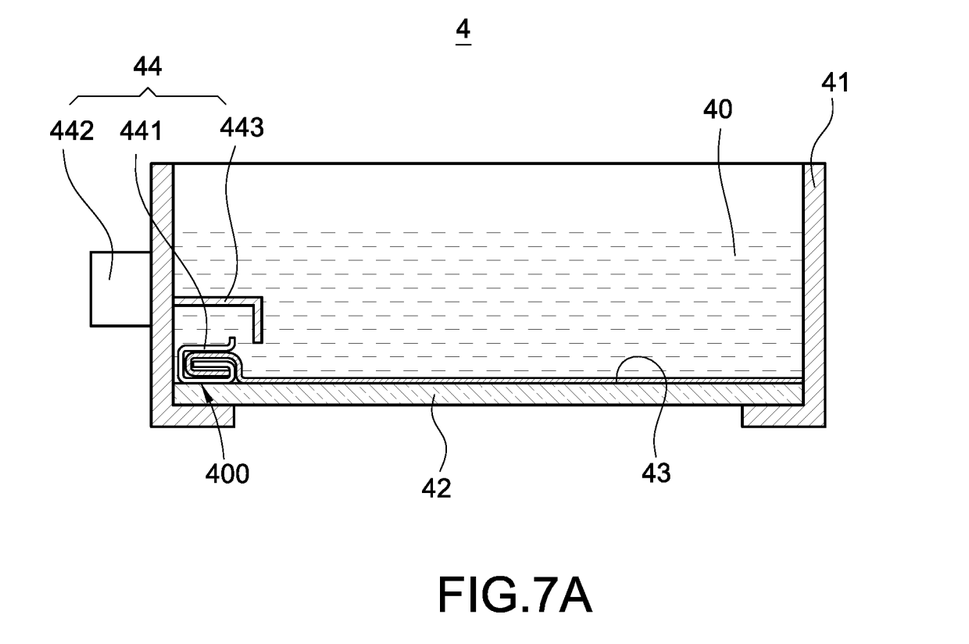
FIG. 7A is a schematic diagram of a photocuring type 3D printer according to the second embodiment of the disclosed example.

FIG. 7A is a schematic diagram of a photocuring type 3D printer according to the second embodiment of the disclosed example. In the embodiment, the adjusting unit 44 includes a metal sheet 441 and an electromagnet 442.

Specifically, as shown in FIG. 7A, the metal sheet 441 is connected to one side of the membrane 43 and is disposed at one side of the sink 41, the other side of the membrane 43 is connected to the other side of the sink 41 opposite to the metal sheet 441. The electromagnet 442 is disposed around the homing location 400 near one side of the sink 41 and electrically connected to the microprocessor unit 47. In the embodiment shown in FIG. 7A, the electromagnet 442 is disposed at the external side of the sink 41, but the scope is not limited thereto. In other embodiments, the embodiment 442 may also be disposed at the inside of the sink 41.

In the embodiment shown in FIG. 7, the microprocessor unit 47 controls the electromagnet 442 to power on before starting to print the printing layer in order to attract the metal sheet 441 to move horizontally toward the electromagnet 442 to the homing location 400 for tightening the membrane 43. In addition, the microprocessor unit 47 controls the electromagnet 442 to power off after the printing layer is solidified in order to enable the metal sheet 441 to move horizontally away from the electromagnet 442 (for example move by the tension of the membrane 43) for relaxing the membrane 43.

It should be noted that after the electromagnet 442 is powered off, the metal sheet 441 is no longer attracted to the electromagnet 442. When the membrane 43 is led by the forming platform 45 and the model 5 to move upward, the metal sheet 441 possibly will be out of the magnetic range of the electromagnet 442. Therefore, when the electromagnet 442 is powered on again, the electromagnet 442 cannot attract the metal sheet 441 and enable the metal sheet 441 to go back to the homing position 400 and as a result cannot tighten the membrane 43.

In terms of the issue, the relaxing unit 44 may further includes a limit unit for limiting the metal sheet 441 within a fixed range around the homing location 400. In the embodiment in FIG. 7A, the limit unit is a limit structure 443. The limit structure 443 is disposed around the homing location 400 and used for limiting the moving range of the metal sheet 441 for assuring that the metal sheet 441 cannot move out of the effective magnetic range of the electromagnet 442 once the metal sheet 441 is not attracted by the electromagnet 442.

Figure 7B:
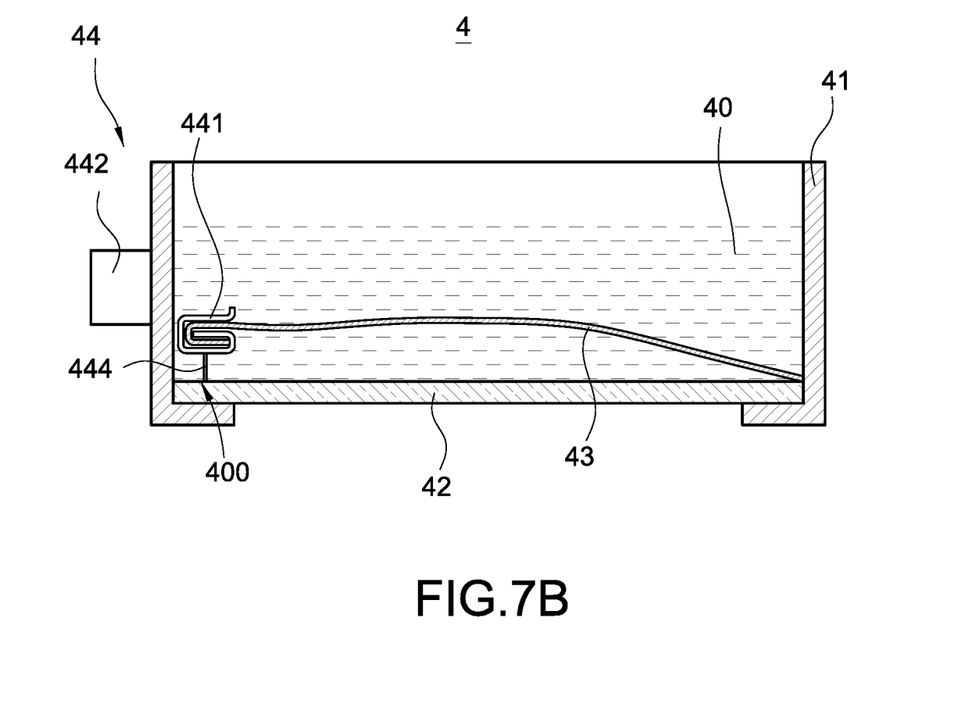
FIG. 7B is a schematic diagram of a photocuring type 3D printer according to the third embodiment of the disclosed example.

FIG. 7B is a schematic diagram of a photocuring type 3D printer according to the third embodiment of the disclosed example. The difference between the present embodiment and the second embodiment disclosed in FIG. 7A is that the limit unit of the adjusting unit 44 is a connection line 444.

As shown in FIG. 7B, one side of the connection line 444 is connected to the metal sheet 441 and the other end is connected to the membrane 43, the glass layer 42 or a location of the sink 41 near the homing location 400. In the embodiment, the 3D printer 4 uses the connection line 444 to limit the moving range of the metal sheet 441 for assuring that the metal sheet 441 cannot move out of the effective magnetic range of the electromagnet 442 once the metal sheet 441 is not attracted by the electromagnet 442.

Figure 7C:
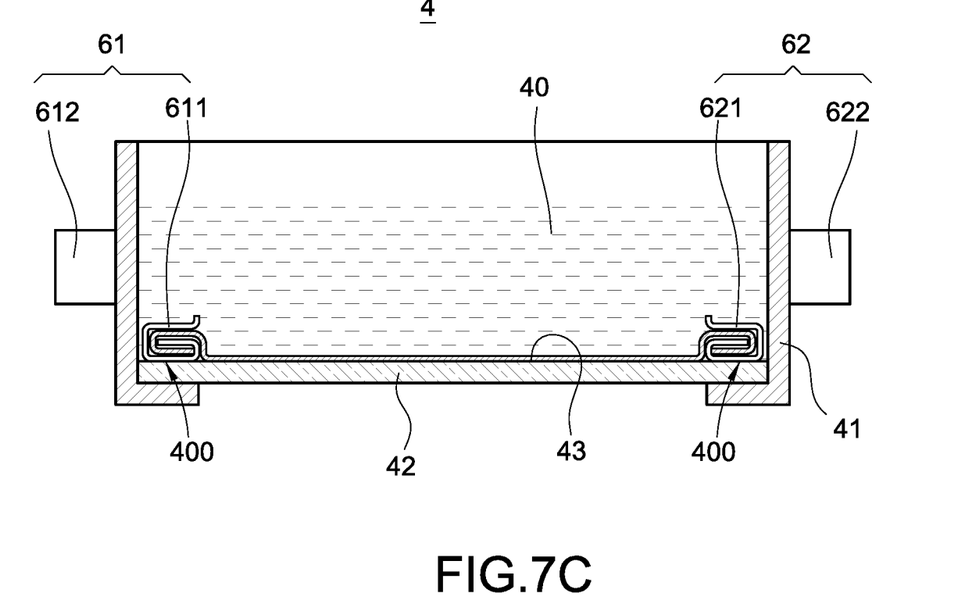
FIG. 7C is a schematic diagram of a photocuring type 3D printer according to the fourth embodiment of the disclosed example.

FIG. 7C is a schematic diagram of a photocuring type 3D printer according to the fourth embodiment of the disclosed example. The difference between the 3D printers 4 disposed in the present embodiment, FIGS. 7A and 7B is that the 3D printer 4 in the present embodiment may configure at least two adjusting units 44.

As shown in FIG. 7C, the two adjusting units 44 include a first adjusting unit 61 and a second adjusting unit 62, wherein the first adjusting unit 61 is disposed on one side of the sink 41, the second adjusting unit is disposed on the other side of the sink 41 opposite to the first adjusting unit 61. The one side of the membrane 43 is connected to the first adjusting unit 61, and the other side of the membrane 43 is connected to the second adjusting unit 62. The first adjusting unit 61 includes a metal sheet 611 and an electromagnet 612, and the second adjusting unit 62 includes a metal sheet 621 and an electromagnet 622. In the embodiment, the metal sheets 611, 621 are identical with the above-mentioned metal sheet 441, the electromagnets 612, 622 are identical with the above-mentioned electromagnet 442, and are electrically connected to the microprocessor unit 47, and are not repeated herein.

In the embodiment shown in FIG. 7C, two homing locations 400 are respectively disposed at the opposite sides of the sink 41, the electromagnet 612 of the first adjusting unit 61 is disposed around the homing location 400 on one side of the sink 41, the electromagnet 622 of the second adjusting unit 62 is disposed around the other homing location 400 on the other side, the metal sheet 611 of the first adjusting unit 61 is connected to the one side of the membrane 43 and is attracted to the electromagnet 612, and the metal sheet 621 of the second adjusting unit 62 is connected to the other side of the membrane 43 and is attracted to the electromagnet 622.

It should be noted that if the two adjusting units 61, 62 are disposed at the 3D printer 4, the microprocessor unit 47 then controls at least one of the two adjusting units 61, 62 to move horizontally toward the outside of the sink 41 to the corresponding homing location 400 for tightening the membrane 43 (i.e. powers on the electromagnet 612 and/or the electromagnet 622 for enabling the metal sheet 611 and/or metal sheet 621 to move horizontally to the corresponding homing locations 400) in step S12 shown in FIG. 5.

Also, the microprocessor unit 47 controls at least one of the two adjusting units 61, 62 to move horizontally toward the center of the sink 41 for relaxing the membrane 43 (i.e. powers off the electromagnet 612 and/or the electromagnet 622 for enabling the metal sheet 611 and/or metal sheet 621 to move horizontally away from the corresponding homing locations 400) in step S18 shown in FIG. 5.

With disposing multiple adjusting units 44, the tightening and relaxing procedure of the membrane 43 of the disclosed example are faster and the printing speed of the 3D printer 4 is further improved.

Figure 8A:
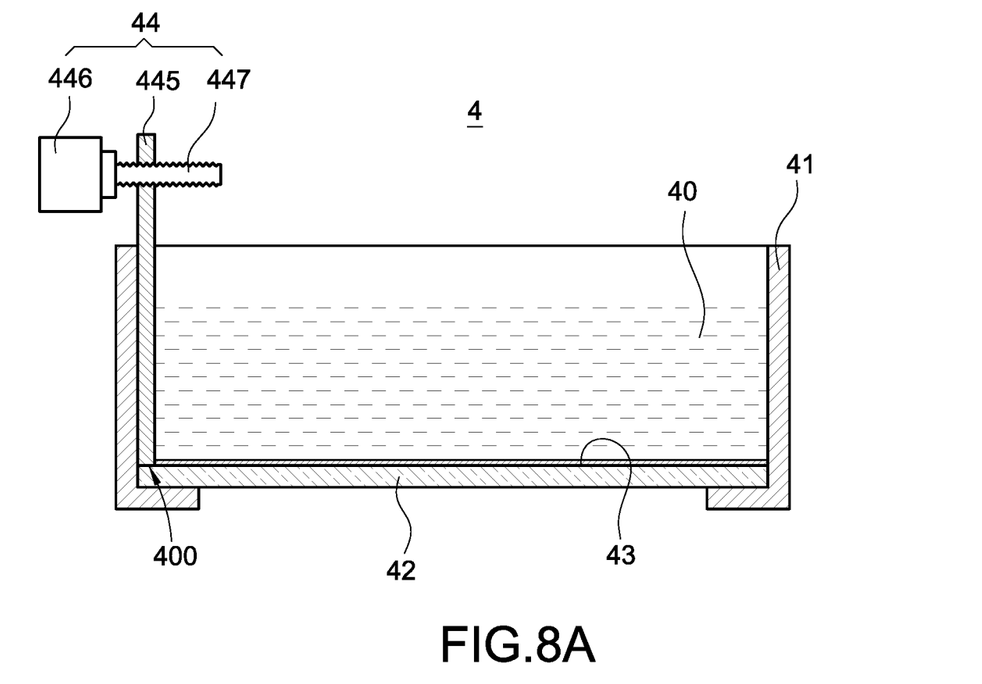
FIG. 8A is a schematic diagram of a photocuring type 3D printer according to the fifth embodiment of the disclosed example.
Figure 8B:
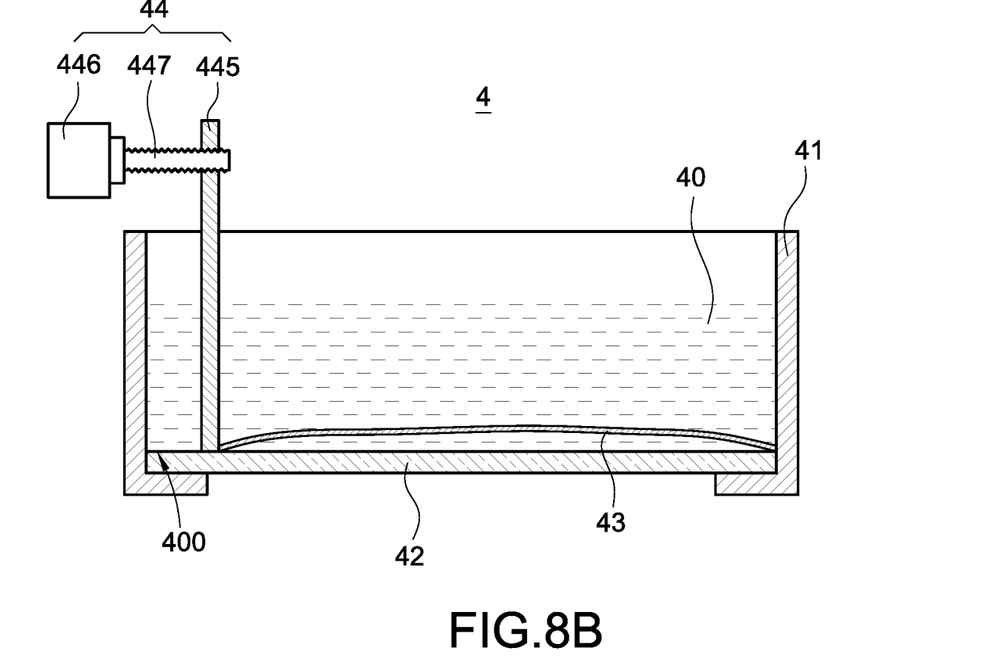
FIG. 8B is a variation schematic diagram of a photocuring type 3D printer according to the fifth embodiment of the disclosed example.

FIG. 8A is a schematic diagram of a photocuring type 3D printer according to the fifth embodiment of the disclosed example and FIG. 8B is a variation schematic diagram of a photocuring type 3D printer according to the fifth embodiment of the disclosed example. In the embodiment, the adjusting unit 44 includes a connecting rod 445, a motor 446 and a screw 447.

Specifically, as shown in FIG. 8A, one side of the connecting rod 445 is connected to one side of the membrane 43, the motor 446 is disposed at one side of the sink 41, and the other side of the membrane 43 is connected to the other side of the sink 41 opposite to the motor 446. The motor 446 is connected to the screw 447 and connected to the other side of the connecting rod 445 via the screw 447. Also, the motor 446 electrically connects to the microprocessor unit 47.

In the embodiment shown in FIG. 8A, the connecting rod 445 is vertically connected to the membrane 43 and the screw 447 (i.e. the membrane 43 is parallel to the screw 447), but the scope is not limited thereto.

In the embodiment shown in FIG. 8B, the microprocessor unit 47 in the 3D printer 4 firstly controls the motor 446 to rotate toward a first direction (e.g., a clockwise direction) before starting to print the printing layer in order to led the connecting rod 445 to move horizontally toward the motor 446 to the homing location 400 via the screw 447 for tightening the membrane 43. Also, the microprocessor unit 47 controls the motor 446 to rotate toward a second direction opposite to the first direction (e.g., a counterclockwise direction) after the printing layer is solidified in order to led the connecting rod 445 to move horizontally away from the motor 446 via the screw 447 for relaxing the membrane 43.

Figure 8C:
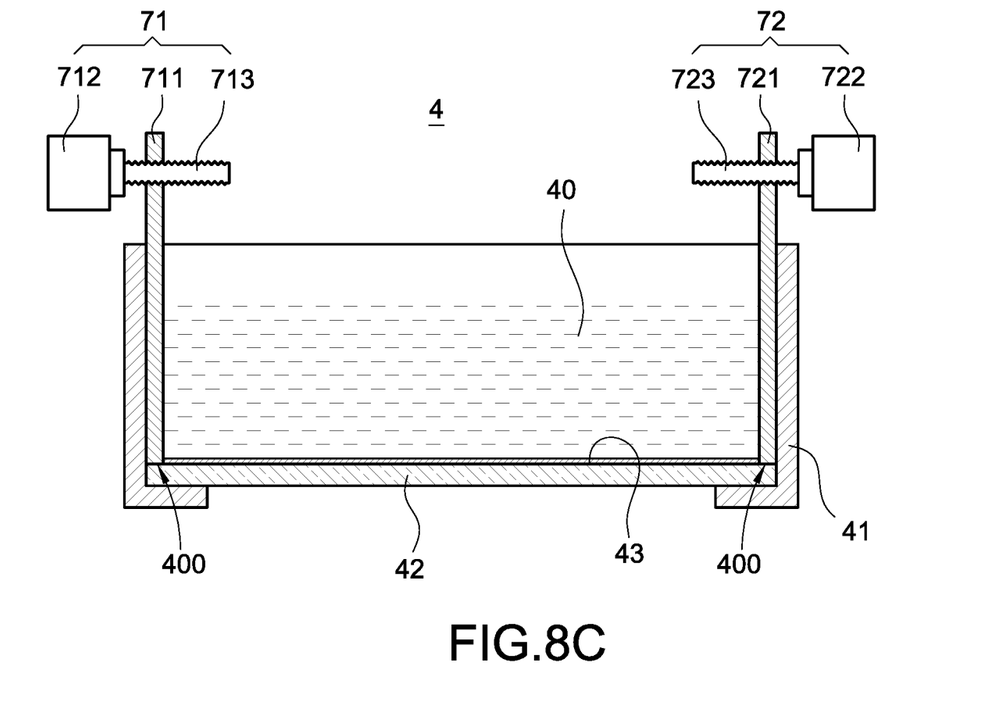
FIG. 8C is a schematic diagram of a photocuring type 3D printer according to the sixth embodiment of the disclosed example.

FIG. 8C is a schematic diagram of a photocuring type 3D printer according to the sixth embodiment of the disclosed example. The difference between the 3D printers 4 disposed in the present embodiment, FIGS. 8A and 8B is that the 3D printer 4 in the present embodiment can include at least two adjusting units 44.

As shown in FIG. 8C, the two adjusting units 44 include a first adjusting unit 71 and a second adjusting unit 72, wherein the first adjusting unit 71 is disposed on one side of the sink 41, the second adjusting unit 72 is disposed on the other side of the sink 41 opposite to the first adjusting unit 71. The one side of the membrane 43 is connected to the first adjusting unit 71, and the other side of the membrane 43 is connected to the second adjusting unit 72. The first adjusting unit 71 includes a connecting rod 711, a motor 712 and a screw 713, and the second adjusting unit 72 includes a connecting rod 721, a motor 722 and a screw 723. In the embodiment, the connecting rods 711, 721 are identical with the above mentioned connecting rod 445, the motors 712, 722 are identical with the above-mentioned motor 446, the screws 713, 723 are identical with the above-mentioned screw 447, and the motors 711, 712 are electrically connected to the microprocessor unit 47, and are not repeated herein.

In the embodiment shown in FIG. 8C, two homing locations 400 are respectively disposed at the opposite sides of the sink 41, the motor 712 of the first adjusting unit 71 is disposed around the homing location 400 on one side, and the motor 722 of the second adjusting unit 72 is disposed around the homing location 400 on the other side. The connecting rod 711 of the first adjusting unit 71 is connected to the one side of the membrane 43 and is led to move horizontally via the motor 712 and the screw 713, and connecting rod 721 of the second adjusting unit 72 is connected to the other side of the membrane 43 and led to move horizontally via the motor 722 and the screw 723.

If two adjusting units 71, 72 are disposed at the 3D printer 4, the microprocessor unit 47 then controls at least one of the two adjusting units 71, 72 to move horizontally toward the outside of the sink 41 to the corresponding homing location 400 for tightening the membrane 43 (i.e. controls the motor 712 and/or the motor 722 to rotate toward the first direction for leading the connecting rod 711 and/or connecting rod 721 to move horizontally to the corresponding homing locations 400) in step S12 shown in FIG. 5.

Also, the microprocessor unit 47 controls at least one of the two adjusting units 71, 72 to move horizontally toward the center of the sink 41 for relaxing the membrane 43 (i.e. controls the motor 712 and/or the motor 722 to rotate toward the second direction for leading the connecting rod 711 and/or connecting rod 721 to move horizontally away from the corresponding homing locations 400) in step S18 shown in FIG. 5.

Among each embodiment of the disclosed example, the printing procedure and the peeling procedure for the 3D printer 4 are assisted by repeatedly tightening or relaxing the membrane without damaging the model 5 and the printing of the photocuring type 3D printing is easily implemented.

As the skilled person will appreciate, various changes and modifications can be made to the described embodiment. It is intended to include all such variations, modifications and equivalents which fall within the scope of the present disclosed examples, as defined in the accompanying claims.

What is claimed is:

1. A photocuring type 3D printer, comprising:
   a sink for containing a forming liquid;
   a glass layer disposed on a bottom of the sink;
   an adjusting unit disposed on one side of the sink and controlled to move horizontally;
   a membrane disposed above the glass layer, one side of the membrane connected to the adjusting unit, the other side of the membrane connected to the other side of the sink opposite to the adjusting unit;
   an emitting unit disposed below the sink and configured for emitting lights toward an internal side of the sink;
   a forming platform disposed above the sink; and
   a microprocessor unit electrically connected to the adjusting unit, the emitting unit and the forming platform;
   wherein, the microprocessor unit is configured to control the adjusting unit to move horizontally toward an outward direction of the sink to a homing location for tightening the membrane before starting to print a printing layer of a model, and the emitting unit is configured to emit lights for solidifying the printing layer and attaching to the forming platform;
   wherein the microprocessor unit is configured to control the adjusting unit to move horizontally toward a center of the sink for relaxing the membrane after the printing layer is solidified, and is configured to control the forming platform to move along a z axis for peeling the printing layer from the membrane; and
   wherein, the adjusting unit comprises a connecting rod with one end connected to the membrane and a motor connected to other end of the connecting rod via a screw and electrically connected to the microprocessor unit, wherein the microprocessor unit is configured to control the motor to rotate toward a first direction for leading the connecting rod to move horizontally toward the motor to the homing location for tightening the membrane before printing the printing layer, and is configured to control the motor to rotate toward a second direction for leading the connecting rod to move horizontally away from the motor for relaxing the membrane.

2. The photocuring type 3D printer of claim 1, wherein the membrane is polytetrafluoroethylene.

3. The photocuring type 3D printer of claim 1, further comprising a second adjusting unit disposed on other side of the sink opposite to the adjusting unit, wherein the one side of the membrane is connected to the adjusting unit, and the other side of the membrane is connected to the second adjusting unit.

4. The photocuring type 3D printer of claim 3, wherein the microprocessor unit is configured to control at least one of the adjusting unit and the second adjusting unit to move horizontally to the outward direction of the sink to the homing location for tightening the membrane, and is configured to control at least one of the adjusting unit and the second adjusting unit to move horizontally to the center of the sink for relaxing the membrane.

5. A peeling method used for a photocuring type 3D printer, the photocuring type 3D printer having a sink for containing a forming liquid, a glass layer disposed on a bottom of the sink, a membrane disposed above the glass layer with one side of the membrane connected to one side of the sink, an emitting unit disposed below the sink, and a forming platform disposed above the sink, and characterized in that the photocuring type 3D printer further comprises an adjusting unit disposed at the other side of the sink and connected to other side of the membrane, and a microprocessor unit electrically connected to the adjusting unit, the emitting unit and the forming platform, and the peeling method comprising:
   a) obtaining printing data corresponding to a printing layer of a model;
   b) the microprocessor unit controlling the adjusting unit to move horizontally toward an outward direction of the sink to a homing location for tightening the membrane according to the printing data, wherein the adjusting unit comprises a connecting rod with one end connected to the membrane and a motor connected to other end of the connecting rod via a screw and electrically connected to the microprocessor unit, the microprocessor is controlling the motor to rotate toward a first direction for leading the connecting rod to move horizontally toward the motor to the homing location;
   c) the microprocessor unit controlling the forming platform to move along a z axis so as to immerse in the forming liquid and to locate at a printing height of the printing layer;
   d) the microprocessor unit controlling the emitting unit to emit lights toward an internal side of the sink for solidifying the printing layer and attaching to the forming platform;
   e) the microprocessor unit controlling the adjusting unit to move horizontally toward a center of the sink for relaxing the membrane after step d), wherein the microprocessor is controlling the motor to rotate toward a second direction for leading the connecting rod to move horizontally away from the motor; and
   f) the microprocessor unit controlling the forming platform to move along the z axis for peeling the printing layer from the membrane after step e).

6. The peeling method for the photocuring type 3D printer of claim 5, further comprising following steps:
   g) determining if the model is completely printed after the printing layer is peeled from the membrane; and
   h) obtaining printing data corresponding to a next printing layer of the model before the model is not completely printed and re-executing the step b) to the step f) according to the printing data of the next printing payer.

7. The peeling method for the photocuring type 3D printer of claim 6, wherein step g) is determining that the printing layer is peeled from the membrane when the forming platform moves to a threshold height.

* * * * *